3,026,208
PROCESS FOR THE TREATMENT OF WATER
Albert Szent-Gyorgyi, % Institute for Muscle Research,
Marine Biological Laboratory, Woods Hole, Mass.
No Drawing. Filed Sept. 15, 1960, Ser. No. 56,125
3 Claims. (Cl. 99—155)

This invention relates to the treatment of water and it has particular relation to the elimination or improvement of taste and odor of water treated with chlorine for disinfection.

Water is one of the most important constituents of human diet. It is the constituent taken in largest quantity and, therefore, its enjoyment is important. However, the water supply of communities has in many cases to be disinfected to make its drinking safe and this disinfection is mostly done by chlorination. When the water reaches the consumer, the water contains a small excess of chlorine and also some chlorinated compounds formed during chlorination and said small excess of chlorine and said compounds give the water a repulsive taste and odor. Therefore, various suggestions were made e.g. either to treat the chlorinated water in order to remove from it free chlorine and/or chlorinated compounds, or to add to the chlorinated water certain chemicals which were supposed to react with the free chlorine present in the water.

However, it has been found that these methods are expensive or clumsy, unfit for big scale manipulation and do not give the desired results. The chemicals suggested to react with chlorine, such as thiosulfate, are not quite tasteless themselves, they do not solve the problem and are not capable to eliminate the repulsive taste caused by various organic substances, which are mostly oxidized or chlorinated phenolic compounds. Thiosulfate or other commercially used reducing agents do not eliminate the bad taste and smell of these phenolic compounds or other chlorinated products.

It has now been discovered that ascorbic acid (vitamin C), added to water, not only reduces the free chlorine, but also interacts with the chlorinated compounds present in chlorinated water and deprives them of their bad taste and smell. Vitamin C is a highly reactive substance which reacts both in its original form or in its oxidized form—i.e. after having been oxidized by free chlorine— and in its use according to this invention results in products which have no undesired smell or taste.

It has been found that e.g. one gram of vitamin C mixed with 0.5 gram $NaHCO_3$, added to 15 liters of chlorinated water gives a neutral aqueous solution which has no taste or smell. This would correspond to 20–25 mg. of the mixture per glass (200 ml.). On dissolution in water the bicarbonate will form a salt with the vitamin C.

*Example*

A mixture is formed from 1.0 part by weight of ascorbic acid (in the L-form) and 0.5 part by weight of $NaHCO_3$. 20 mgs. of this mixture added to one glass (about 200 ml.) of chlorinated water of repulsive taste and odor turn this flued into a refreshing drink, which can be consumed as such, or frozen into cubes. In carrying out this invention one gram of the ascorbic acidbicarbonate mixture are usually sufficient for the treatment of 10 liters of water.

Ascorbic acid is a good "electron donor" and probably interacts with chlorinated aromatic compounds by donating them electrons, satisfying the electron affinity, whether free or bound. It will be understood, however, that I do not want to limit myself to this theory.

It will be also understood that this invention is not limited to the specific conditions or materials described above and may be carried out with various modifications. For example, in carrying out the invention synthetic or natural ascorbic acid can be used and the ascorbic acid can be used in L- or D-form in the manner described in the above example. Instead of sodium bicarbonate an equivalent amount of $Na_2CO_3$, $K_2CO_3$ or $KHCO_3$ can be used, but I prefer the use of $NaHCO_3$. The mixture of ascorbic acid and $NaHCO_3$ or the like, can be dispensed e.g. from plastic shakers or can be formed by conventional methods to tablets of suitable weight, e.g. tablets containing 20 mg. (or a multiple of this amount) of said mixture. These and other modifications can be made without departing from the scope of the invention as defined in the appended claims.

The parts and percent mentioned herein are by weight if not otherwise stated.

Reference is made to my co-pending application filed in my name on August 1, 1960, for improvements in "Process for the Treatment Of Water," Ser. No. 46,337, and now abandoned, of which this is a continuation-in-part.

What is claimed is:

1. A process for improving the taste and odor of water disinfected with chlorine, comprising removing residual chlorine and chlorine-containing compounds by reacting them with ascorbic acid and a substance selected from the group consisting of sodium bicarbonate, potassium bicarbonate, sodium carbonate and potassium carbonate, added to said water.

2. A process for improving the taste and odor of water disinfected with chlorine, comprising removing residual chlorine and chlorine-containing compounds by reacting them with a mixture of ascorbic acid and a substantially equivalent amount of $NaHCO_3$, added to said water.

3. A process as claimed in claim 2, in which the ascorbic acid is added in an amount of about 1 part and the sodium bicarbonate in an amount of about 0.5 part to 15,000 parts by weight of the water.

References Cited in the file of this patent

UNITED STATES PATENTS 2,694,719   Opplt _____ Nov. 16, 1954